United States Patent [19]
Setiabudi et al.

[11] Patent Number: 6,147,026
[45] Date of Patent: *Nov. 14, 2000

[54] CATALYST MIXTURE FOR THE RING-OPENING METATHESIS POLYMERISATION

[75] Inventors: Frans Setiabudi, Eschbach, Germany; Dean Tallak Behm, Newark, Del.

[73] Assignee: Ciba Specialty Chemcials Corporation, Tarrytown, N.Y.

[*] Notice: This patent is subject to a terminal disclaimer.

[21] Appl. No.: 08/970,990

[22] Filed: Nov. 14, 1997

[30] Foreign Application Priority Data

Nov. 15, 1996 [CH] Switzerland .................... 2826/96

[51] Int. Cl.$^7$ .................................................. B01J 31/00
[52] U.S. Cl. ................... 502/162; 502/152; 502/155; 502/156; 502/169; 502/172
[58] Field of Search ................... 502/150, 152, 502/155, 156, 158, 161, 169, 170, 172, 162

[56] References Cited

U.S. PATENT DOCUMENTS

| | | | |
|---|---|---|---|
| 3,855,323 | 12/1974 | Lyons | 260/666 A |
| 3,957,827 | 5/1976 | Lyons | 502/155 |
| 3,962,294 | 6/1976 | Lyons | 502/155 |
| 5,312,940 | 5/1994 | Grubbs et al. | 556/136 |
| 5,342,909 | 8/1994 | Grubbs et al. | 556/136 |
| 5,559,262 | 9/1996 | Beatty et al. | 502/155 |
| 5,599,962 | 2/1997 | Beatty et al. | 556/21 |
| 5,710,298 | 1/1998 | Grubbs et al. | 502/155 |
| 5,726,334 | 3/1998 | Beatty et al. | 502/155 |
| 5,728,785 | 3/1998 | Grubbs et al. | 526/142 |
| 5,831,108 | 11/1998 | Grubbs et al. | 502/152 |
| 5,912,376 | 6/1999 | Van Der Schaaf et al. | 502/155 |
| 5,917,071 | 6/1999 | Grubbs et al. | 502/152 |
| 5,939,504 | 8/1999 | Woodson, Jr. et al. | 502/152 |
| 5,977,393 | 11/1999 | Grubbs et al. | 502/162 |
| 5,998,326 | 11/1999 | Hafner et al. | 502/155 |

FOREIGN PATENT DOCUMENTS

| | | |
|---|---|---|
| 0 839 821 | 10/1997 | European Pat. Off. . |
| 56-140948 | 11/1981 | Japan .................... 502/152 |
| 9313171 | 7/1993 | WIPO . |
| 96/16100 | 5/1996 | WIPO . |
| 9620235 | 7/1996 | WIPO . |
| WO 97/40934 | 11/1997 | WIPO . |
| WO 98/39346 | 9/1998 | WIPO . |

OTHER PUBLICATIONS

L. Porri et al., Die Makromolekulare Chemie, vol. 175, pp. 3097–3115, 1974.

C. Grunwald et al., Advance ACS Abstracts, vol. 4, No. 6, p. 140, Mar. 15, 1996.

(List continued on next page.)

*Primary Examiner*—Mark L. Bell
*Assistant Examiner*—J. Pasterczyk
*Attorney, Agent, or Firm*—Michele A. Kovaleski; David R. Crichton; Luther A. R. Hall

[57] ABSTRACT

A composition, comprising (a) a compound of formula I $$(R_1R_2R_3P)_xL_yM^{2+}Z_1^-Z_2^- \qquad (I),$$

wherein $R_1$, $R_2$ and $R_3$ are each independently of one another H, $C_1$–$C_{20}$ alkyl, $C_1$–$C_{20}$-alkoxy; $C_4$–$C_{12}$ cycloalkyl which is unsubstituted or substituted by $C_1$–$C_6$ alkyl, $C_1$–$C_6$ haloalkyl or $C_1$–$C_6$ alkoxy; $C_4$–$C_{12}$ cycloalkoxy which is unsubstituted or substituted by $C_1$–$C_6$-alkyl, $C_1$–$C_6$ haloalkyl or $C_1$–$C_6$ alkoxy; $C_6$–$C_{16}$ aryl which is unsubstituted or substituted by $C_1$–$C_6$ alkyl, $C_1$–$C_6$ haloalkyl or $C_1$–$C_6$ alkoxy; $C_6$–$C_{16}$ aryloxy which is unsubstituted or substituted by $C_1$–$C_6$ alkyl, $C_1$–$C_6$ haloalkyl or $C_1$–$C_6$ alkoxy; $C_7$–$C_{16}$ aralkyl which is unsubstituted or substituted by $C_1$–$C_6$ alkyl, $C_1$–$C_6$ haloalkyl or $C_1$–$C_6$ alkoxy; or $C_7$–$C_{16}$ aralkyloxy which is unsubstituted or substituted by $C_1$–$C_6$ alkyl, $C_1$–$C_6$ haloalkyl or $C_1$–$C_6$ alkoxy;

or $R_2$ and $R_3$ together are tetra- or pentamethylene which is unsubstituted or substituted by $C_1$–$C_6$alkyl, $C_1$–$C_6$ haloalkyl or $C_1$–$C_6$ alkoxy; tetra- or pentamethylenedioxyl which is unsubstituted or substituted by $C_1$–$C_6$ alkyl, $C_1$–$C_6$ haloalkyl or $C_1$–$C_6$ alkoxy; tetra- or pentamethylene which is condensed with one or two 1,2-phenylene radicals and which is unsubstituted or substituted by $C_1$–$C_6$ alkyl, $C_1$–$C_6$ haloalkyl or $C_1$–$C_6$ alkoxy; tetra- or pentamethylenedioxyl which is condensed with one or two 1,2-phenylene radicals and which is unsubstituted or substituted by $C_1$–$C_6$ alkyl, $C_1$–$C_6$haloalkyl or $C_1$–$C_6$ alkoxy; or tetramethylenedioxyl which is condensed in the 1,2- and 3,4-position with 1,2-phenylene and which is unsubstituted or substituted by $C_1$–$C_6$ alkyl, $C_1$–$C_6$ haloalkyl or $C_1$–$C_6$ alkoxy; and $R_1$ has the meaning cited above;

L is a neutral ligand; M is Ru or Os; $Z_1^-$ and $Z_2^-$ are each a singly charged anion, or $Z_{1-}$ and $Z_2^-$ together are a doubly charged anion; x is a number from 1 to 3; and y is a number from 0 to 3, wherein $2 \leq x+y \leq 4$; and (b) a compound of formula II $$R_4\text{—}C\equiv C\text{—}H \qquad (II),$$

wherein $R_4$ is a monovalent organic radical of up to 30 carbon atoms which contains at least one hydroxyl group, is suitable as storage-stable two-component catalyst for the ring-opening metathesis polymerisation of cyclopentadiene adducts and makes it possible to polymerise dicyclopentadiene and other cyclopentadiene adducts within a short time and with high enthalpy of reaction and only little weight loss.

7 Claims, No Drawings

OTHER PUBLICATIONS

P. Schwab et al., Angew. Chem. Int. Ed. Engl. vol. 34, No. 18, pp. 2039–2041, 1995.

P. Schwab et al., J. Am. Chem. Soc., vol. 118, No. 1, pp. 100–110, 1996.

A. Stumpf et al., J. Chem. Soc., Chem. Commun., pp. 1127–1128, 1995.

C. Grunwald et al., Organometallics, vol. 15, No. 8, pp. 1960–1962, 1996.

Journal of Molecular Catalysis, 76, (1992) pp. 123–132. A. Demonceau et al.

CATALYST MIXTURE FOR THE RING-OPENING METATHESIS POLYMERISATION

The present invention relates to a catalyst composition consisting of a ruthenium or osmium phosphine complex and a hydroxyl group-containing alkyne; to a mixture comprising a Diels-Alder adduct of cyclopentadiene and such a catalyst composition; to a process for the preparation of a metathesis polymer as well as to the use of the polymerisable composition as casting resin, impregnating resin or as encapsulating material for electrical or electronic components.

WO 93/13171 describes air- and water-stable one- and two-component catalysts based on carbonyl group-containing molybdenum and tungsten compounds as well as ruthenium and osmium compounds having at least one polyene ligand for the thermal and photoactivated ring-opening metathesis polymerisation (ROMP) of strained cycloolefins, in particular norbornenes and norbornene derivatives.

1-Alkynes are, inter alia, recommended as co-catalysts for the two-component catalysts.

Demonceau et al. [A. Demonceau, A. F. Noels, E. Saive and A. J., Hubert: J. Mol. Catal. 76, 123–132 (1992)] describe $(C_6H_5)_3]_3PRuCl_2$, $(C_6H_5)_3]_3PRuHCl$ and (p-cymene)$RuCl_2P(C_6H_{11})_3$ as thermal catalysts for the ring-opening metathesis polymerisation of norbornene. The relatively low activity of these catalysts is increased by addition of diazo esters. It is also mentioned that only (p-cymene)$RUCl_2P(C_6H_{11})_3$ is able to polymerise norbornene in relatively short time at 60° C. Another monomer mentioned is cyclooctene. No other cycloolefins suitable for the metathesis polymerisation are mentioned.

WO 96/20235 describes ruthenium and osmium complex compounds as excellent catalysts for the metathesis polymerisation of di- and oligocyclopentadienes.

Surprisingly, it has now been found that the addition of hydroxyl group-containing 1-alkynes increases the catalytic activity of the ruthenium and osmium phosphines very substantially and improves the properties of the polymers considerably. The addition of hydroxyl group-containing 1-alkynes as co-catalysts moreover results in a very uniform liberation of the enthalpy of reaction, i.e. there are no high peak temperatures during polymersation. When polymerising dicyclopentadiene it is thus possible, for example, to lower the peak temperature from the usual c. 180° C. to <100° C. In this manner polymers having excellent physical and mechanical properties may be prepared within shorter polymerisation times.

Furthermore, the catalyst system is latent and storage-stable and not susceptible to air and moisture, which also permits marketing formulated polymerisable compositions.

This invention relates to a composition, comprising (a) a compound of formula I $$(R_1R_2R_3P)_xL_yM^{2+}Z_1^-Z_2^- \qquad (I),$$

wherein $R_1$, $R_2$ and $R_3$ are each independently of one another H, $C_1$–$C_{20}$ alkyl, $C_1$–$C_{20}$-alkoxy; $C_4$–$C_{12}$ cycloalkyl which is unsubstituted or substituted by $C_1$–$C_6$alkyl, $C_1$–$C_6$ haloalkyl or $C_1$–$C_6$ alkoxy; $C_4$–$C_{12}$ cycloalkoxy which is unsubstituted or substituted by $C_1$–$C_6$ alkyl, $C_1$–$C_6$ haloalkyl or $C_1$–$C_6$ alkoxy; $C_6$–$C_{16}$ aryl which is unsubstituted or substituted by $C_1$–$C_6$ alkyl, $C_1$–$C_6$ haloalkyl or $C_1$–$C_6$ alkoxy; $C_6$–$C_{16}$ aryloxy which is unsubstituted or substituted by $C_1$–$C_6$ alkyl, $C_1$–$C_6$ haloalkyl or $C_1$–$C_6$ alkoxy; $C_7$–$C_{16}$ aralkyl which is unsubstituted or substituted by $C_1$–$C_6$ alkyl, $C_1$–$C_6$ haloalkyl or $C_1$–$C_6$ alkoxy; or $C_7$–$C_{16}$ aralkyloxy which is unsubstituted or substituted by $C_1$–$C_6$ alkyl, $C_1$–$C_6$ haloalkyl or $C_1$–$C_6$ alkoxy;

or $R_2$ and $R_3$ together are tetra- or pentamethylene which is unsubstituted or substituted by $C_1$–$C_6$ alkyl, $C_1$–$C_6$ haloalkyl or $C_1$–$C_6$ alkoxy; tetra- or pentamethylenedioxyl which is unsubstituted or substituted by $C_1$–$C_6$ alkyl, $C_1$–$C_6$ haloalkyl or $C_1$–$C_6$ alkoxy; tetra- or pentamethylene which is condensed with one or two 1,2-phenylene radicals and which is unsubstituted or substituted by $C_1$–$C_6$ alkyl, $C_1$–$C_6$ haloalkyl or $C_1$–$C_6$ alkoxy; tetra- or pentamethylenedioxyl which is condensed with one or two 1,2-phenylene radicals and which is unsubstituted or substituted by $C_1$–$C_6$ alkyl, $C_1$–$C_6$ haloalkyl or $C_1$–$C_6$alkoxy; or tetramethylenedioxyl which is condensed in the 1,2- and 3,4-position with 1,2-phenylene and which is unsubstituted or substituted by $C_1$–$C_6$ alkyl, $C_1$–$C_6$ haloalkyl or $C_1$–$C_6$ alkoxy; and $R_1$ has the meaning cited above;

L is a neutral ligand;

M is Ru or Os;

$Z_1^-$ and $Z_2^-$ are each a singly charged anion, or $Z_1^-$ and $Z_2^-$ together are a doubly charged anion;

x is a number from 1 to 3; and y is a number from 0 to 3, wherein $2 \leq x+y \leq 4$; and (b) a compound of formula II $$R_4-C\equiv C-H \qquad (II),$$

wherein $R_4$ is a monovalent organic radical of up to 30 carbon atoms which contains at least one hydroxyl group.

The alkyl groups in formulae I and II may be straight-chain or branched. This also applies to the, or every, alkyl moiety of alkoxy-, hydroxyalkyl- or haloalkyl-containing groups and other groups containing alkyl. These alkyl groups preferably contain 1 to 12, particularly preferably 1 to 8 and, most preferably, 1 to 4, carbon atoms.

Alkyl typically includes methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Alkoxy is typically methoxy, ethoxy, propyloxy, isopropyloxy, n-butyloxy, isobutyloxy, sec-butyloxy and tert-butyloxy.

Haloalkyl typically comprises fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl as well as halogenated, in particular fluorinated or chlorinated, isopropyl, n-propyl, n-butyl, isobutyl, sec-butyl and tert-butyl groups as well as the different isomeric halogenated pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Cycloalkyl is preferably $C_5$–$C_8$cycloalkyl, in particular $C_5$- or $C_6$cycloalkyl. Typical examples are cyclopropyl, dimethylcyclopropyl, cyclobutyl, cyclopentyl, methylcyclopentyl, cyclohexyl, cycloheptyl and cyclooctyl.

Cycloalkoxy groups are, for example, cyclopentyloxy, methylcyclopentyloxy and cyclohexyloxy.

Aryl preferably contains 6 to 10 carbon atoms and may typically be phenyl, pentalinyl, indenyl, naphtyl, azulinyl and anthryt.

Aryloxy groups are, for example, phenyloxy, naphthyloxy and anthryloxy.

Aralkyl preferably contains 7 to 12 carbon atoms and, particularly preferably, 7 to 10 carbon atoms. Aralkyl may typically be benzyl, phenethyl, 3-phenylpropyl, α-methylbenzyl, 4-phenylbutyl and α,α-dimethylbenzyl.

Illustrative examples of aralkyloxy groups are benzyloxy, phenethyloxy, 3-phenylpropyloxy, α-methylbenzyloxy, 4-phenylbutyloxy and α,α-dimethylbenzyloxy.

Hydroxyalkyl includes, for example, hydroxymethyl, hydroxyethyl, 1-hydroxyisopropyl, 1-hydroxy-n-propyl, 2-hydroxy-n-butyl, 1-hydroxyisobutyl, 1-hydroxy-sec-butyl, 1-hydroxy-tert-butyl as well as the different hydroxyl-substituted isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Preferred components (a) are compounds of formula I, wherein M is ruthenium.

Other preferred components (a) are compounds of formula I, wherein $R_1$, $R_2$ and $R_3$ are each independently of one another $C_1$–$C_6$alkyl, $C_1$–$C_6$alkoxy, $C_4$–$C_{12}$cycloalkyl, $C_4$–$C_{12}$cycloalkoxy, $C_6$–$C_{16}$aryl or $C_6$–$C_{16}$aryloxy.

Particularly preferred compounds of formula I are those, wherein $R_1$, $R_2$ and $R_3$ are each independently of one another isopropyl, sec-butyl, phenyl, tolyl, cyclopentyl or cyclohexyl.

L in formula I is preferably benzene, thiophene, benzonitrile or acetonitrile which is unsubstituted or substituted by 1 to 3 $C_1$–$C_4$alkyl, nitrogen ($N_2$), unsubstituted or partially or completely fluorinated $C_1$–$C_4$alcohol, CO, $H_2O$ or $NH_3$.

Those compounds of formula I are also preferred, wherein $Z_1^-$ and $Z_2^-$ are each independently of the other $H^-$, $F^-$, $Cl^-$, $Br^-$, $I^-$, or cyclopentadienyl which is unsubstituted or substituted by one or several hydroxide groups, amino groups, halogen atoms, $C_1$–$C_{20}$alkyl groups, $C_1$–$C_{20}$alkoxy groups, $C_4$–$C_{12}$cycloalkyl groups, $C_4$–$C_{12}$cycloalkoxy groups, $C_6$–$C_{16}$aryl group, $C_6$–$C_{16}$aryloxy groups or $C_7$–$C_{16}$aralkyl groups.

The complex compounds of formula I are known and are described, inter alia, in WO 96/16100 and WO 96/20235.

Typical examples of ruthenium and osmium compounds of of formula I are [tos denotes tosylate, Cp is cyclopentadienyl, and $C_6H_{11}$ is cyclohexyl]: $(C_6H_{11})_2HPRu$ (p-cymene)$Cl_2$, $(C_6H_{11})_3PRu(p-cymene)Cl_2$, $(C_6H_{11})_3PRu$ (p-cymene)(tos)$_2$, $(C_6H_{11})_3PRu(p-cymene)Br_2$, $(C_6H_{11})_3PRu(p-cymene)ClF$, $(C_6H_{11})_3PRu(C_6H_6)(tos)_2$, $(C_6H_{11})_3PRu(CH_3-C_6H_5)(tos)_2$, $(C_6H_{11})_3PRu(C_{10}H_8)(tos)_2$, $(i-C_3H_7)_3PRu(p-cymene)Cl_2$, $(CH_3)_3PRu(p-cymene)Cl_2$, $(C_6H_{11})_3PRu(CH_3-CN)(C_2H_5-OH)(tos)_2$, $(C_6H_{11})_3PRu$ (p-cymene)$(CH_3-CN)_2(PF_6)_2$, $(C_6H_{11})_3PRu(p-cymene)(CH_3-CN)_2(tos)_2$, $(n-C_4H_9)_3PRu(p-cymene)(CH_3-CN)_2(tos)_2$, $(C_6H_{11})_3PRu(CH_3CN)Cl_2$, $(C_6H_{11})_3PRu(CH_3-CN)_2Cl_2$, $(n-C_4H_9)_3PRu(p-cymene)Cl_2$, $(C_6H_{11})_3PRu(p-cymene)(C_2H_5OH)_2(BF_4)_2$, $(C_6H_{11})_3PRu(p-cymene)(C_2H_5OH)_2(PF_6)_2$, $(i-C_3H_7)_3POs(p-cymene)Cl_2$, $(CH_3)_3POs(p-cymene)Cl_2$, $(C_6H_5)_3POs(p-cymene)Cl_2$, $[(C_6H_{11})_3P]_3Ru(CH_3-CN)$, $(C_5H_9)_3PRu(p-cymene)Cl_2$, $(C_6H_{11})_3PRu(p-cymene)HCl$, $(C_6H_{11})_3PRu[1,2,4,5-(CH_3)_4C_6H_2]Cl_2$, $(C_6H_{11})_3PRu[1,3,5-(i-C_3H_7)_3C_6H_3]Cl_2$, $(C_6H_{11})_3PRu[(C_4H_9)-C_6H_5]Cl_2$, $(C_6H_{11})_3POs(p-cymene)Cl_2$, $(C_6H_5)_3PRu(p-cymene)HCl$, $[(C_6H_{11})_3P]_2Ru(CH_3-CN)(tos)_2$, $RuCl_2(p-cymene)[(C_6H_{11})_2PCH_2CH_2P(C_6H_{11})_2]$, $(C_6H_{11})_3PRu(p-cymene)(C_2H_5OH)(BF_4)_2$, $(C_6H_{11})_3PRu(C_6H_6)(C_2H_5OH)_2(tos)_2$, $(C_6H_{11})_3PRu(i-C_3H_7-C_6H_5)(tos)_2$, $(C_6H_{11})_3PRu(C_6H_6)(p-cymene)Br_2$, $(C_6H_{11})_3PRu(biphenyl)(tos)_2]$, $(C_6H_{11})_3PRu(anthracene)(tos)_2$, $(2-CH_3C_6H_4)_3POs(p-cymene)Cl_2$ and $(C_6H_{11})_3PRu(chrysene)(tos)_2$.

Particularly preferred compounds of formula I are $[(C_6H_{11})_3P]_2RuCl_2$, $[(C_6H_5)_3P]_3\ RuCl_2$, $[(C_6H_5)_3P]_3\ (CO)RuH_2$, $[(C_6H_5)_3P]_3\ RuClCp$, $[(C_6H_{11})_3P]_2(CH_3OH)Ru(tos)_2$, $[(o-tolyl)_3P]_3RuCl_2$, $[(CH_3)_2CH]_3P(p-cymene)RuCl_2$ and, in particular, $(C_6H_{11})_3P(p-cymene)RuCl_2$.

The compounds of formula II are also known and some are commercially available. Illustrative examples of the compounds of formula II are 3-hydroxyphenylethyne, 1-ethynyl-1-cyclopentanol, 1-ethynyl-1-cyclohexanol, 9-ethynyl-9-fluorenol, 1-propynylcyclohexanol, 2-propyn-1-ol, 1,1-diphenyl-2-propyn-1-ol, 3-butyn-1-ol, 3-butyn-2-ol, 1-phenyl-2-propyn-1-ol, 2-phenyl-3-butyn-2-ol, 2-methyl-3-butyn-2-ol, 1-pentyn-3-ol, 4-pentyn-1-ol, 4-pentyn-2-ol, 3-methyl-1-pentyn-3-ol, 4-methyl-1-pentyn-3-ol, 1-hexyn-3-ol, 1-heptyn-3-ol, 3-ethyl-1-heptyn-3-ol, 3-ethyl-5-methyl-1-heptyn-3-ol and 10-undecyn-1-ol.

Component (b) in the novel compositions is preferably a compound of formula II, wherein $R_4$ is a $C_1$–$C_{20}$alkyl, $C_1$–$C_{20}$alkoxy, $C_4$–$C_{12}$cycloalkyl, $C_4$–$C_{12}$cycloalkoxy, $C_6$–$C_{16}$aryl, $C_6$–$C_{11}$aryloxy or $C_7$–$C_{16}$aralkyl group which is substituted by at least one hydroxyl group.

$R_4$ in formula II is particularly preferably $C_1$–$C_{12}$hydroxyalkyl.

Particularly preferred compounds of formula II are 2-methyl-3-butyn-2-ol and 2-phenyl-3-butyn-2-ol.

The amounts of components (a) and (b) in the novel compositions can vary within a wide range.

The weight ratio of components (a):(b) is preferably from 25:1 to 1:10, more preferably from 10:1 to 1:2 and, very particularly preferably, from 7:1 to 2:1.

Particularly suitable compositions are those containing about equimolar amounts of components (a) and (b), i.e. compositions, wherein the molar ratio of components (a):(b) is from 1.1:1 to 1:1.1.

As has been mentioned at the outset, the novel compositions are suitable as storage-stable two-component catalysts for the ring-opening metathesis polymerisation of cyclopentadiene adducts. With this novel catalyst system it is possible to polymerise dicyclopentadiene and other cyclopentadiene adducts in substantially shorter time and with high enthalpy of reaction and only little weight loss. The polymers are distinguished by a high glass transition temperature and by generally good mechanical properties.

Accordingly, this invention also relates to a composition comprising components (a) and (b) defined above and, additionally, (c) a Diels-Alder adduct of cyclopentadiene.

Components (c) are preferably compounds of formula III

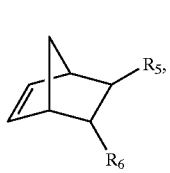

(III)

wherein $R_5$ and $R_6$ are each independently of the other hydrogen, $C_1$–$C_{12}$alkyl, phenyl, tolyl, cyclohexyl, cyclohexenyl, halogen, cyano, $C_1$–$C_{12}$hydroxyalkyl or $C_1$–$C_{12}$haloalkyl, or $R_5$ and $R_6$, together with the linking carbon atoms, are a five- or six-membered ring.

Suitable Diels-Alder adducts are, for example, the following compounds:

(1) 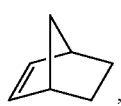,
(2) 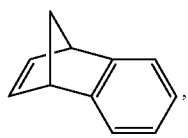,
(3) 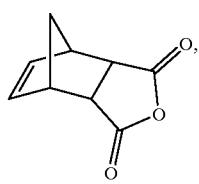,
(4) 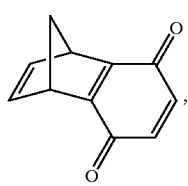,
(5) 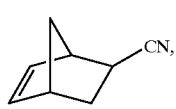,
(6) ,
(7) ,
(8) 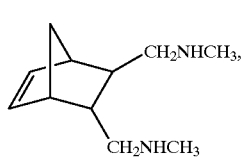,
(9) 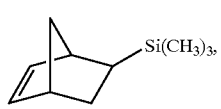,
(10) 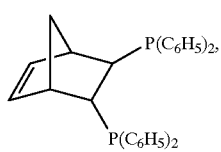,
-continued
(11) 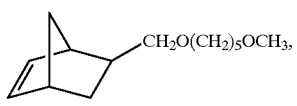,
(11) ,
(12) 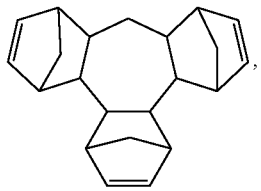,
(13) 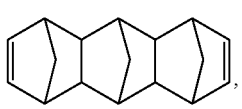,
(14) 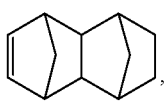,
(15) 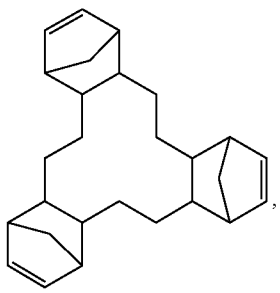,
(16) 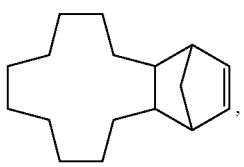,
(17) 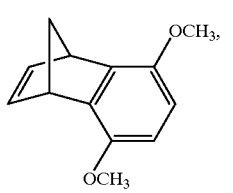,
(18) 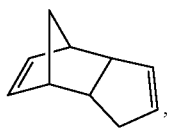,

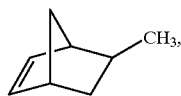
(19)

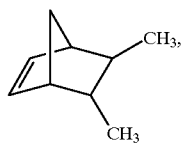
(20)

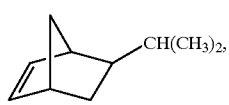
(21)

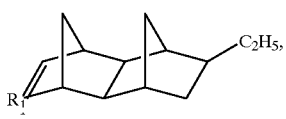
(22)

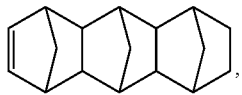
(23)

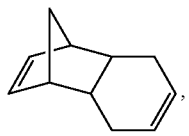
(24)

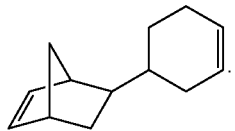
(25)

Preferred Diels-Alder adducts are norbornene (1), norbornadiene (6), cyclohexenyinorbornene (25), tetracyclododecene (14), methyltetracyclododecene (11) and, in particular, dicyclopentadiene (18).

The amounts of components (a), (b) and (c) in the novel compositions can vary within a wide range.

Preferred compositions are those containing 0.001–10.0% by weight, particularly preferably 0.01–5.0% by weight, most preferably 0.1–2.0% by weight, of component (a), 0.001–10.0% by weight, particularly preferably 0.005–2.0% by weight, most preferably 0.01–1.0% by weight, of component (b), and 85.0–99.99% by weight, particularly preferably 90.0–99.9% by weight, most preferably 95.0–99.8% by weight, of component (c), based on the entire composition (a)+(b)+(c).

The weight ratio of monomer (component c) to catalyst mixture (components a+b) can also vary within a wide range.

The novel compositions preferably contain 85.0–99.99% by weight, in particular 90.0–99.9% by weight, of monomer, and 0.01–15.0% by weight, in particular 0.1–10.0% by weight, of catalyst mixture, based on the entire composition.

The desired viscosity of the curable mixture can be adjusted by adding thermoplastic materials. Typical examples of suitable thermoplasts are polystyrene, polynorbornene (e.g. Norsorex® NS, of Nippon Zeon), hydrated polynorbornene derivatives (e.g. Zeonex®, of Nippon Zeon), polycyclooctene (e.g. Vestenamer®, of Hüls), and polybutadiene.

The curable mixtures can also comprise tougheners, for example core/shell polymers or the elastomers or elastomer-containing graft polymers known to the skilled person as rubber tougheners.

Suitable tougheners are described, inter alia, in EP-A-449 776.

To improve the electrical properties (dielectric constant, loss factor) of the curable mixtures, silanes, such as the compounds provided by Osi Specialties under the registered trademark Silquest® Silan, may be added. Suitable silanes are typically octyltriethoxysilane, methyltriethoxysilane, vinyltriethoxysilane, methyltrimethoxysilane, vinyltrimethoxysilane, γ-aminopropyltrimethoxysilane and γ-glycidyloxypropyltrimethoxysilane.

In addition to the above-mentioned additives, the novel compositions can contain further customary additives, typically antioxidants, light stabilisers, plasticisers, colourants, pigments, thixotropic agents, antifoams, antistatic agents, lubricants and mould release agents.

The novel compositions can also contain inert solvents. Suitable inert solvents are, for example, protic-polar and aprotic solvents which can be used by themselves or in mixtures consisting of at least two solvents. Typical examples are: ethers (dibutyl ether, tetrahydrofuran, dioxane, 2-methoxyethanol or ethylene glycol dimethyl ether, 2-ethoxyethanol or ethylene glycol diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1,2,2-tetrachloroethane), carboxylates and lactones (ethyl acetate, methyl propionate, ethyl benzoate, 2-methoxyethyl acetate, γ-butyrolactone, δ-valerolactone, pivalolactone), carboxamides and lactams (N,N-dimethylformamide, N,N-diethylformamide, N,N-dimethyl acetamide, tetramethylurea, hexamethylphosphoric triamide, γ-butyrolactam, ε-caprolactam, N-methylpyrrolidone, N-acetylpyrrolidone, N-methylcaprolactam), sulfoxides (dimethylsulfoxide), sulfones (dimethylsulfone, diethylsulfone, trimethylenesulfone, tetramethylenesulfone), tertiary amines (N-methylpiperidine, N-methylmorpholine), aliphatic and aromatic hydrocarbons, typically petroleum ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and nonpolar solvents.

Preferred solvents are aliphatic and aromatic hydrocarbons as well as mixtures of such solvents.

It is a particular advantage of the novel compositions that in the case of liquid monomers a metathesis polymerisation can be carried out without using a solvent.

The novel composition can be prepared directly before polymerisation or can be used in the form of a preformulated mixture. The mixture can be stored for an extended period of time as ready-to-use formulation before polymerisation, which is advantageous for large scale industrial application. However, it is advisable to store the mixture with the exclusion of light if the catalyst contains photosensitive ligands.

Both components (a) and (b) are nonreactive at room temperature to strained cycloolefins, i.e. mixtures containing a Diels-Alder adduct of cyclopentadiene and component (a)

or a Diels-Alder adduct of cyclopentadiene and component (b) are storage-stable for several months at room temperature. Only when the two components are mixed is a product obtained which acts as catalyst for the ring-opening metathesis polymerisation. The novel two-component system is therefore particularly suitable for the RIM process because the polymerisable cycloolefin can be divided into two portions prior to processing which are then charged with the corresponding amounts of components (a) and (b). When the two portions are mixed and injected into the preheated mould, the mixture polymerises very rapidly and forms cured products having good mechanical properties.

In another of its aspects, this invention therefore also relates to a curable 2-component system consisting of at least two components (d) and (e), wherein (d) is a mixture consisting of 90.0–99.999% by weight, preferably of 95.0–99.995% by weight, more preferably of 98.0, 0–99.99% by weight, of a Diels-Alder adduct of cyclopentadiene and of 0.001–10.0% by weight, preferably of 0.005–5.0% by weight, more preferably of 0.01–2.0% by weight, of the above component (a), and (e) is a mixture consisting of 90.0–99.999% by weight, preferably of 95.0–99.995% by weight, more preferably of 98.0–99.99% by weight, of a Diels-Alder adduct of cyclopentadiene and of 0.001–10.0% by weight, preferably of 0.005–5.0% by weight, more preferably of 0.01–2.0% by weight, of the above component (b).

This invention also relates to a process for the preparation of a metathesis polymer, which comprises heating a composition comprising the components (a) to (c) to a temperature of >40° C.

The process of this invention is conveniently carried out at a temperature of at least 60° C. The novel process is carried out in particular in the temperature range from 60 to 300° C., preferably from 60 to 250° C., more preferably from 60 to 200° C. and, most preferably, from 70 to 160° C. After polymerisation it may be useful to after-bake the mixture at elevated temperatures, typically in the range from 80 to 200° C.

If component (a) is a compound of formula I with photosensitive ligands, the metathesis polymersiation may also be carried out photochemically. In this case, a composition comprising components (a) to (c) is irradiated with UV radiation or visible light and is then heat-postcured, if required.

The polymerisation can involve moulding processes, for example calendering, casting, compression moulding, injection moulding or extruding processes. Using the novel process it is possible to prepare materials for the preparation of moulded articles of all kinds as well as coatings. Moulding and polymerisation are usefully combined in solvent-tree reactive systems, in which case it is possible to use processing techniques such as injection moulding, extrusion, polymerisations in given moulds (if required under pressure).

The mixtures prepared according to the novel process can additionally contain homopolymers, copolymers with random distribution of the structural units, graft polymers, block polymers or crosslinked polymers. The polymers may have an average molecular weight of 500 up to 2 000 000 dalton, preferably of 1000 to 1 000 000 dalton (determined by gel permeation chromatography).

The mixtures prepared in accordance with the novel process are particularly distinguished by their high heat stability, excellent toughness and mechanical strength as well as by good electrical properties (low dielectric constant, low loss factor or tanδ value) and are particularly suitable for applications in vacuum casting technology, as casting resins, impregnating resins and especially as encapsulating materials for electrical and electronic components.

The cured casting compounds have good mechanical and dielectrical properties and long durability.

Accordingly, this invention also relates to the use of the novel compositions as casting resin, impregnating resin and as encapsulating material for electrical or electronic components.

EXAMPLES

The following abbreviations are used in the Working Examples:

DSC: differential scanning calorimetry

TGA: thermogravimetrical analysis

RT: room temperature $T_g$: glass transition temperature

ΔH: enthalpy of reaction

Commercially available dicyclopentadiene (BF Goodrich, USA) having a purity of 98.4% (determined by gas chromatography) is used in all the Examples. The ROMP catalyst is $(C_6H_{11})_3P(p\text{-cymene})RuCl_2$ (catalyst A).

Example 1

0.2 g of catalyst A is dissolved in 100 g of liquid dicyclopentadiene (heated to 40° C.). Subsequently, 0.043 g of 2-methyl-3-butyn-2-ol is added and dissolved by stirring. This mixture is then polymerised (curing cycle: 1 h/80° C., 1 h/100° C., 2 h/120° C.), measuring the peak temperature of $T_{max}$=83° C. obtained after 80 min during the first curing phase. The glass transition temperature of the cured product is $T_g$=123° C.; the reaction determined by TGA is 94%.

Example 2

In general analogy to Example 1, a mixture consisting of 100 g of liquid dicyclopentadiene, 0.2 g of catalyst A and 0.075 g of 2-phenyl-3-butyn-2-ol is polymerised. A peak temperature of $T_{max}$=142° C. is obtained during the first curing phase after 97 min.

What is claimed is:

1. A composition, comprising (a) $[(C_6H_1)_3P]_2RuCl_2$, $[(C_6H_5)_3P]_3 RuCl_2$, $[(C_6H_5)_3P]_3 (CO)RuH_2$, $[(C_6H_5)_3P]_3 Ru(Cl)(cyclopentadienyl)$, $[(C_6H_{11})_3P]_2(CH_3OH)Ru(tos)_2$, $[(o\text{-tolyl})_3P]_3RuCl_2$, $[(CH_3)_2CH]_3P(p\text{-cymene})RuCl_2$ or $(C_6H_{11})_3P(p\text{-cymene})RuCl_2$; and (b) a compound of formula II

$$R_4—C\equiv C—H \qquad (II),$$

wherein $R_4$ is a monovalent organic radical of up to 30 carbon atoms which contains at least one hydroxyl group.

2. A composition according to claim 1, wherein component (a) is $(C_6H_{11})_3P(p\text{-cymene})RuCl_2$. $C_6$–$C_{16}$aryloxy or $C_7$–$C_{16}$aralkyl group which is substituted by at least one hydroxyl group.

3. A composition, comprising (a) $(C_6H_{11})_2HPRu(p\text{-cymene})Cl_2$, $(C_6H_{11})_3PRu(p\text{-cymene})Cl_2$, $(C_6H_{11})_3PRu(p\text{-cymene})(tos)_2$, $(C_6H_{11})_3PRu(p\text{-cymene})Br_2$, $(C_6H_{11})_3PRu(p\text{-cymene})ClF$, $(C_6H_{11})_3PRu(C_6H_6)(tos)_2$, $(C_6H_{11})_3PRu(CH_3—C_6H_5)(tos)_2$, $(C_6H_{11})_3PRu(C_{10}H_8)(tos)_2$, $(i\text{-}C_3H_7)_3PRu(p\text{-cymene})Cl_2$, $(CH_3)_3PRu(p\text{-cymene})Cl_2$, $(C_6H_{11})_3PRu(CH_3—CN)(C_2H_5—OH)(tos)_2$, $(C_6H_{11})_3PRu(p\text{-}$ cymene)(CH$_3$—CN)$_2$(PF$_6$)$_2$, (C$_6$H$_{11}$)$_3$PRu(p-cymene)(CH$_3$—CN)$_2$(tos)$_2$, (n-C$_4$H$_9$)$_3$PRu(p-cymene)(CH$_3$—CN)$_2$(tos)$_2$, (C$_6$H$_{11}$)$_3$PRu(CH$_3$CN)Cl$_2$, (C$_6$H$_{11}$)$_3$PRu(CH$_3$—CN)$_2$Cl$_2$, (C$_6$H$_{11}$)$_3$PRu(p-cymene)(C$_2$H$_5$OH)$_2$(BF$_4$)$_2$, (C$_6$H$_{11}$)$_3$PRu(p-cymene)(C$_2$H$_5$OH)$_2$(PF$_6$)$_2$, (i-C$_3$H$_7$)$_3$POs(p-cymene)Cl$_2$, (CH$_3$)$_3$POs(p-cymene)Cl$_2$, (C$_6$H$_5$)$_3$POs(p-cymene)Cl$_2$, [(C$_6$H$_{11}$)$_3$P]$_3$Ru(CH$_3$—CN), (C$_5$H$_9$)$_3$PRu(p-cymene)Cl$_2$, (C$_6$H$_{11}$)$_3$PRu(p-cymene)HCl, (C$_6$H$_{11}$)$_3$PRu[1,2,4,5-(CH$_3$)$_4$C$_6$H$_2$]Cl$_2$, (C$_6$H$_{11}$)$_3$PRu[1,3,5-(i-C$_3$H$_7$)$_3$C$_6$H$_3$]Cl$_2$, (C$_6$H$_{11}$)$_3$PRu[(C$_4$H$_9$)-C$_6$H$_5$]Cl$_2$, (C$_6$H$_{11}$)$_3$POs(p-cymene)Cl$_2$, (C$_6$H$_5$)$_3$PRu(p-cymene)HCl, [(C$_6$H$_{11}$)$_3$P]$_2$Ru(CH$_3$—CN)(tosylate)$_2$, RuCl$_2$(p-cymene)[(C$_6$H$_{11}$)$_2$PCH$_2$CH$_2$P(C$_6$H$_{11}$)$_2$], (C$_6$H$_{11}$)$_3$PRu(p-cymene)(C$_2$H$_5$OH)(BF$_4$)$_2$], (C$_6$H$_{11}$)$_3$PRu(C$_6$H$_6$)(C$_2$H$_5$OH)$_2$(tosylate)$_2$, (C$_6$H$_{11}$)$_3$PRu(i-C$_3$H$_7$—C$_6$H$_5$)(tosylate)$_2$, (C$_6$H$_{11}$)$_3$PRu(C$_6$H$_6$) (p-cymene)Br$_2$, (C$_6$H$_{11}$)$_3$PRu(biphenyl)(tosylate)$_2$, (C$_6$H$_{11}$)$_3$PRu(anthracene)(tosylate)$_2$, (2-CH$_3$C$_6$H$_4$)$_3$POs(p-cymene)Cl$_2$ or C$_6$H$_{11}$)$_3$PRu(chrysene)(tosylate)$_2$; and (b) a compound of formula II

$$R_4\text{—}C\equiv C\text{—}H \qquad (II),$$

wherein R$_4$ is a monovalent organic radical of up to 30 carbon atoms which contains at least one hydroxyl group.

4. A composition according to claim 3, wherein the molar ratio of components (a):(b) is from 25:1 to 1:10.

5. A composition according to claim 3, wherein component (b) is 2-methyl-3-butyn-2-ol or 2-phenyl-3-butyn-2-ol.

6. A composition according to claim 3, wherein component (b) is a compound of formula II, wherein R$_4$ is C$_1$–C$_{12}$hydroxyalkyl.

7. A composition according to claim 1, wherein component (b) is a compound of formula II, wherein R$_4$ is a C$_1$–C$_{20}$alkyl, C$_1$–C$_{20}$alkoxy, C$_4$–CO$_2$cycloalkyl, C$_4$–C$_{12}$cycloalkoxy, C$_6$–C$_{16}$aryl, C$_6$–C$_{16}$aryloxy or C$_7$–C$_{16}$aralkyl group which is substituted by at least one hydroxyl group.

* * * * *